(12) United States Patent
Sullivan et al.

(10) Patent No.: US 8,699,703 B2
(45) Date of Patent: Apr. 15, 2014

(54) SYSTEM AND METHOD FOR PSEUDO-RANDOM POLYMORPHIC TREE CONSTRUCTION

(75) Inventors: Nicholas T. Sullivan, Sunnyvale, CA (US); Bertrand Mollinier Toublet, Santa Clara, CA (US); Gianpaolo Fasoli, Palo Alto, CA (US); Jon McLachlan, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 150 days.

(21) Appl. No.: 13/276,612

(22) Filed: Oct. 19, 2011

(65) Prior Publication Data

US 2013/0103942 A1   Apr. 25, 2013

(51) Int. Cl.
*H04L 9/00* (2006.01)
(52) U.S. Cl.
USPC ............... 380/43; 380/42; 713/150; 713/168
(58) Field of Classification Search
USPC ...................................... 713/168; 380/42–43
See application file for complete search history.

(56) References Cited

U.S. PATENT DOCUMENTS

| | | | | |
|---|---|---|---|---|
| 5,307,412 | A * | 4/1994 | Vobach | 380/42 |
| 7,212,634 | B2 * | 5/2007 | Briscoe | 380/203 |
| 7,356,148 | B2 * | 4/2008 | Hayashi | 380/281 |
| 7,360,084 | B1 * | 4/2008 | Hardjono | 713/163 |
| 7,584,364 | B2 * | 9/2009 | Jakubowski et al. | 713/190 |
| 7,822,207 | B2 * | 10/2010 | Douguet et al. | 380/277 |
| 2003/0044017 | A1 * | 3/2003 | Briscoe | 380/277 |
| 2003/0177381 | A1 * | 9/2003 | Ofek et al. | 713/200 |
| 2004/0165724 | A1 * | 8/2004 | Choi et al. | 380/45 |
| 2004/0223608 | A1 * | 11/2004 | Oommen et al. | 380/28 |
| 2007/0172066 | A1 * | 7/2007 | Davin | 380/262 |
| 2007/0240217 | A1 | 10/2007 | Tuvell et al. | |
| 2008/0298583 | A1 * | 12/2008 | Ahmed | 380/46 |
| 2009/0022323 | A1 * | 1/2009 | Lee et al. | 380/279 |

(Continued)

FOREIGN PATENT DOCUMENTS

WO    2011/002274 A1    1/2011

OTHER PUBLICATIONS

Qiang Xu and Jaspal Subhlok, "Efficient Discovery of Loop Nests in Communication Traces of Parallel Programs," Technical Report No. UH-CS-08-08, Computer Science Department, University of Houston, May 26, 2008, 19 pages (available online at http://www2.cs.uh.edu/~jaspal/papers/08UH-CS-08-08.pdf, last visited Oct. 19, 2011).

*Primary Examiner* — Linglan Edwards
(74) *Attorney, Agent, or Firm* — Novak Druce Connolly Bove + Quigg LLP (57) ABSTRACT

Disclosed herein are systems, methods, and non-transitory computer-readable storage media for obfuscating data via a pseudo-random polymorphic tree. A server, using a seed value shared with a client device, generates a tag stream according to a byte-string algorithm. The server passes the tag stream and the data to be transmitted to the client device through a pseudo-random polymorphic tree serializer to generate a pseudo-random polymorphic tree, which the server transmits to the client device. The client device, using the same seed and byte-string algorithm, generates the same tag stream as on the server. The client passes that tag stream and the received pseudo-random polymorphic tree through a pseudo-random polymorphic tree parser to extract the data. Data to be transmitted from the server to the client device is hidden in a block of seemingly random data, which changes for different seed values. This approach obfuscates data and has low processing overhead.

23 Claims, 8 Drawing Sheets

(56) References Cited

U.S. PATENT DOCUMENTS

| | | | |
|---|---|---|---|
| 2009/0245516 A1* | 10/2009 | Ravikiran | 380/268 |
| 2010/0058061 A1* | 3/2010 | Folta et al. | 713/171 |
| 2012/0144195 A1* | 6/2012 | Nair et al. | 713/168 |

* cited by examiner

SYSTEM AND METHOD FOR PSEUDO-RANDOM POLYMORPHIC TREE CONSTRUCTION

BACKGROUND

1. Technical Field

The present disclosure relates to data security and more specifically to hiding or obfuscating data via pseudo-random polymorphic trees.

2. Introduction

Many computational situations involve sensitive, private, or otherwise critical data. Some examples of such critical data include cryptographic keys, digital rights management (DRM) keys, certain constant values which should remain secret, and so on. Often this data is shared with different devices as part of an encryption, authentication, or distribution scheme. However, existing encryption-based approaches to protecting distribution of these types of critical information often incorporate known weaknesses or can be exploited, given enough time, using well-known methodologies. Further, once the protection has been 'cracked', attackers only need to extract the key and apply the key to encrypted data.

Another approach to protecting data can be to hide where the data is in the first place. Certain encryption schemes generate recognizable data patterns that an attacker can recognize. Thus, one way to further enhance the secrecy or restrict access to critical data is to 'hide' it so that an attacker is unable to determine where the data is or even that critical data is stored at all.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The principles set forth herein can be incorporated as part of a distribution mechanism for a DRM system, for example. A server can send cryptographic keys embedded within a polymorphic tree to a client, which can then store the cryptographic keys on disk in a way that is not identifiable to an attacker. The client can also use the same mechanism to take those keys and pass them along to another device, such as a portable or embedded device. This approach makes a structure to flexibly hold cryptographic keys or other data in a way that is resistant against attackers.

In more detail, a server generates a tag stream using a byte-string algorithm and based on a seed. The server then passes the tag stream and a data tree, which contains the data to be hidden for delivery to a client, through a pseudo-random polymorphic tree serializer to generate a pseudo-random polymorphic tree. The pseudo-random polymorphic tree contains the data to be hidden, but divided into segments and interspersed among data from the tag stream. Thus, the pseudo-random polymorphic tree is larger than the data tree, and appears to be a set of random information. The server can then send the pseudo-random polymorphic tree to a client device having the same seed.

The client receives the pseudo-random polymorphic tree. Using the same seed and byte-string algorithm as the server, the client generates a tag stream which is identical to the tag stream generated on the server. Using the tag stream, the client processes the pseudo-random polymorphic tree received from the server to extract the data that was hidden for delivery to the client. As set forth below, the client or other similar device can perform steps similar to those performed by the server to re-hide the data in a new pseudo-random polymorphic tree for local storage and later retrieval on the client.

Any and/or all of these steps can be performed in addition to and/or layered on top of an encryption scheme. For example, the data tree can be encrypted before transformation by the pseudo-random polymorphic tree serializer.

The approaches set forth herein can be used to derive a compact set of unique tags of a bounded length, construct a tag set in a deterministic way from a small seed, and/or construct nodes of a pseudo-random tree using tags. Index-based masks can provide pseudo randomness of length. The client and server can change the seed to reconfigure how the data tree is converted to a polymorphic representation embodied in the pseudo-random polymorphic tree. The client and server can rely on an existing shared secret for the seed, such as a unique device identifier of the client. The client and server can cycle through a previously established set of seed values upon each iteration. Further, the server and client can share a set of approved seed values, and the server selects one of the approved seed values at random. Then the client can attempt to decode the received pseudo-random polymorphic tree using each of the approved seed values until one is found to work or until all of the approved seed values have been tried. The server can use a combination of these approaches to generate a different set of bytes to transmit to the client in order to transmit the same data.

One important algorithm is the construction of a pseudo-random string without a repeat of substring length n. To construct such a string, the server uses an iterative approach. While this example is discussed in terms of the server, any device can practice this approach. For any iteration of the algorithm, the server assumes it is operating on a string of length n−1 that satisfies the constraint, and the goal of the current round is to add the n-th character. The server determines which character(s) to add (randomly) to avoid a repeating substring, but ultimately generate a string of pseudorandom characters. The server does not blindly just select random characters, because this approach may (and often will) result in a substring of length n re-appearing. So, one way to work around this constraint of no repeating substrings of length n is to map all of the (n−1) factorial (or (n−1)!) substrings encountered thus far to a bitmap of possible next bytes. If a value is randomly selected that has already been taken, that value is not usable because it would introduce a repetition of length n if added to the n−1 characters. Thus, the server re-selects another random value. If no valid value is possible because all of the 256 n-th options (for values that are a byte long) have been used, then the server can backtrack, using the iterative algorithm, to revisit at least one previous random decision to find a viable string that does not introduce a repeating substring of length n. This algorithm generates an arbitrary length string of some length M filled with pseudo-random content, which does not contain a repeating substring of length n. The asymptotic runtime of this algorithm depends on implementation of how (n−1) is mapped to the bitmap, which is usually lg, so it runs in time $M*lg(N)$.

The principles set forth herein can be applied to cryptographic key delivery and storage. Implementations include client and server architecture, server to mobile device, desktop computer to mobile device, wireless synchronization, storage of pseudo-random polymorphic trees on hard drives or in RAM, etc. The pseudo-random polymorphic trees can be transmitted via network packets from a server to a client. The byte-string algorithm, the parser, and other components of this architecture can be implemented in software and/or hardware.

Disclosed are various systems, methods, and non-transitory computer-readable storage media for performing various portions of this approach. A server practicing a method for generating a pseudo-random polymorphic tree first receives a seed value. Then the server generates a tag stream based on the seed value using a byte-string algorithm, wherein each tag in the tag stream is unique in the tag stream. The tag stream can be a unique set of pseudo-random tags that do not collide with tags derived from the data tree.

The server generates a pseudo-random polymorphic tree using the tag stream and a data tree, and transmits the pseudo-random polymorphic tree to a client device, such as via a wired and/or wireless network. The pseudo-random polymorphic tree can contain a group of segments which, when extracted and reassembled by the client according to the seed value, produce at least one of a cryptographic key, digital rights management information, an identifier, and a cryptographic constant. The group of segments can be a subset of the pseudo-polymorphic tree, with the pseudo-random polymorphic tree containing additional segments which are not included in the group of segments, and which are not part of the data encoded from the data tree. Each segment or node of the pseudo-random polymorphic tree can be unique within the pseudo-random polymorphic tree.

A client practicing a method for extracting data from the pseudo-random polymorphic tree generates the same tag stream based on the same seed value as on the server using the same byte-string algorithm as on the server. The client receives, from the server, the pseudo-random polymorphic tree containing data generated by the server. The client parses the pseudo-random polymorphic tree, based on the tag stream, to extract a data tree containing keys. The client only uses a subset of the tag stream to extract the data tree.

A client can also store a local version of what the server generates and sends to the client. For example, the client can generate a tag stream according to a seed value and a byte string algorithm, process the tag stream and a data tree with a pseudo-random polymorphic tree serializer to yield a pseudo-random polymorphic tree, and store the pseudo-random polymorphic tree for later retrieval. The data tree can include at least one of a link, an index, a pointer, an executable file, a data packet, an object, a file, an instruction, an image, a pointer, and media content. The byte string algorithm can take a parameter indicating a length of the tag stream. Further, the tag stream can be bounded to a maximum length. Each tag in the tag stream can be a fixed size, variable size, and/or of multiple different sizes. However, the tag stream can implement a minimum tag size.

The client can likewise restore or retrieve the data from a stored pseudo-random polymorphic tree. The client retrieves the pseudo-random polymorphic tree from a storage location associated with the client device, wherein the pseudo-random polymorphic tree is generated according to a seed value, and wherein the pseudo-random polymorphic tree encodes a tag stream. The client parses the pseudo-random polymorphic tree using the seed value according to a byte-string algorithm to extract the tag stream.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The present disclosure addresses the need in the art for securing information and hiding it in what appears to be random data. A brief introductory description of a basic general purpose system or computing device in FIG. 1 which can be employed to practice the concepts is disclosed herein. A more detailed description of generating and decoding pseudo-random polymorphic trees within which to hide the information will then follow. Several variations shall be discussed herein as the various embodiments are set forth. The disclosure now turns to FIG. 1.

Figure 1:
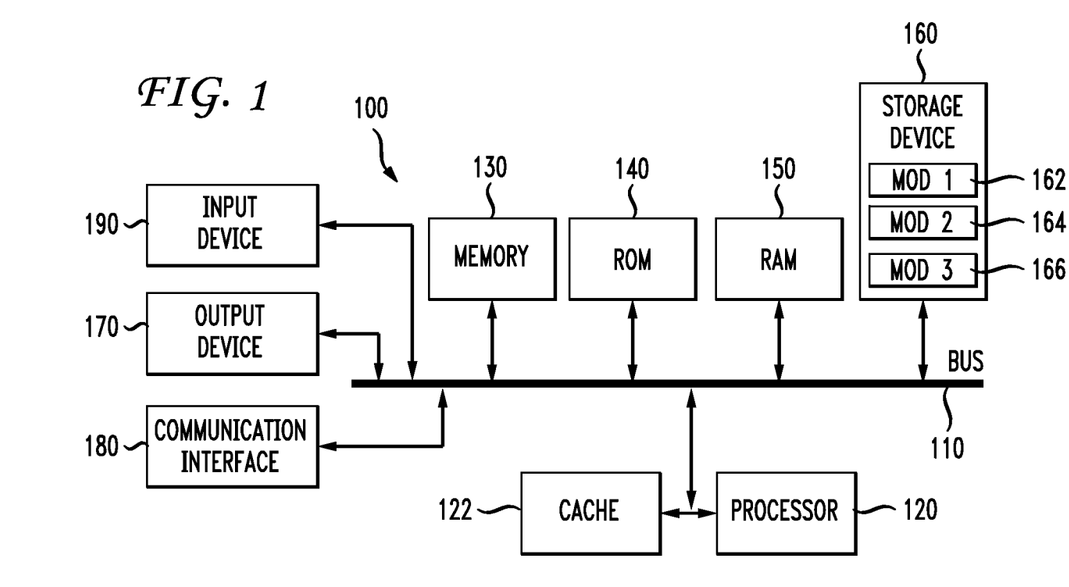
FIG. 1 illustrates an example system embodiment.

With reference to FIG. 1, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. The system 100 can include a cache 122 of high speed memory connected directly with, in close proximity to, or integrated as part of the processor 120. The system 100 copies data from the memory 130 and/or the storage device 160 to the cache 122 for quick access by the processor 120. In this way, the cache provides a performance boost that avoids processor 120 delays while waiting for data. These and other modules can control or be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output system (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a non-transitory computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Non-transitory computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited non-transitory computer-readable storage media. Such logical operations can be implemented as modules configured to control the processor 120 to perform particular functions according to the programming of the module. For example, FIG. 1 illustrates three modules Mod 1 162, Mod 2 164 and Mod 3 166 which are modules configured to control the processor 120. These modules may be stored on the storage device 160 and loaded into RAM 150 or memory 130 at runtime or may be stored as would be known in the art in other computer-readable memory locations.

Having disclosed some components of a computing system, the disclosure now returns to a discussion of obfuscating or hiding data within a pseudo-random polymorphic tree. The approaches set forth herein provide flexibility for the message itself, as well as allows the pseudo-random polymorphic tree (i.e. a container) that contains the keys to be different every time the pseudo-random polymorphic tree is generated. The pseudo-random polymorphic tree is able to be quickly generated by the server and consumed by the client without having to do complex cryptographic or encryption operations on one side or the other. This approach effectively presents a tree structure in a way that appears pseudo-random so that an attacker viewing the bytes only sees what appears to be a series of random bytes. Therefore, the pseudo-random polymorphic tree is either not identifiable or not likely to be identified, thereby preventing an attacker from creating a reverse-engineered parser that can extract the valuable parts from the pseudo-random polymorphic tree. The valuable parts of the pseudo-random polymorphic tree can include cryptographic keys, digital rights management information, an identifier, a feed, a cryptographic constant, media content, an executable file, instructions, settings, authentication data, synchronization data, metadata, and/or other information.

This solution provides an algorithm to generate a standard tree using a very small generating seed. The tree can be a pseudo-random polymorphic tree. When the pseudo-random polymorphic tree is stored on disk in a file, the contents are not purely random but are more or less indistinguishable from random bytes. When constructing this tree, the server has all of these tags that are intended to be represented in the tree, and these tags are essentially strings that represent little markers, or points in the tree that are connected with a particular piece of data like a key. This approach generates these strings in a unique fashion so that for any particular tree a substring of size n is not repeated. In other words, each substring of size n is unique. These substrings identify important pieces of information unique from one another. They also appear pseudo-random within the tree. The algorithm set forth below examines a solution n−1 string that doesn't have a repetition of length n. If the algorithm tries to add one more byte, it randomly picks the next bytes in your string and checks to make sure that the next bytes are a viable option and that that next bytes don't present any repetition of length k.

The algorithm provides an iterative solution that is light weight in comparison to doing full-blown cryptography or using a pseudo-random number generator. The pseudo-random polymorphic tree is light weight to construct and of sufficiently low complexity that even a modest client device can do it on the fly and server-side computational requirements are very low. This approach does not encrypt data, which would lead to managing another key. It is fairly well-known how to decrypt something after an attacker discovers the key. The attacker can just apply the key to encrypted data to decrypt it. Rather, this approach hides data in a set of data that appears to be random. The randomness is based on the uniqueness that this algorithm guarantees. The algorithm generates a unique set of pseudo-random tags that do not collide with the set of tags that are being hidden from attackers. The data to be hidden is interspersed among the unique set of pseudo-random tags in a particular order according to the pseudo-random polymorphic tree serializer.

The pseudo-random polymorphic tree is constructed to generate pseudo-random useless tags that are not identical to the data to hide. This ensures that, when unpacking the pseudo-random polymorphic tree, the portions corresponding to the data are identifiable from the filler, garbage, or nonsense portions.

Figure 2:
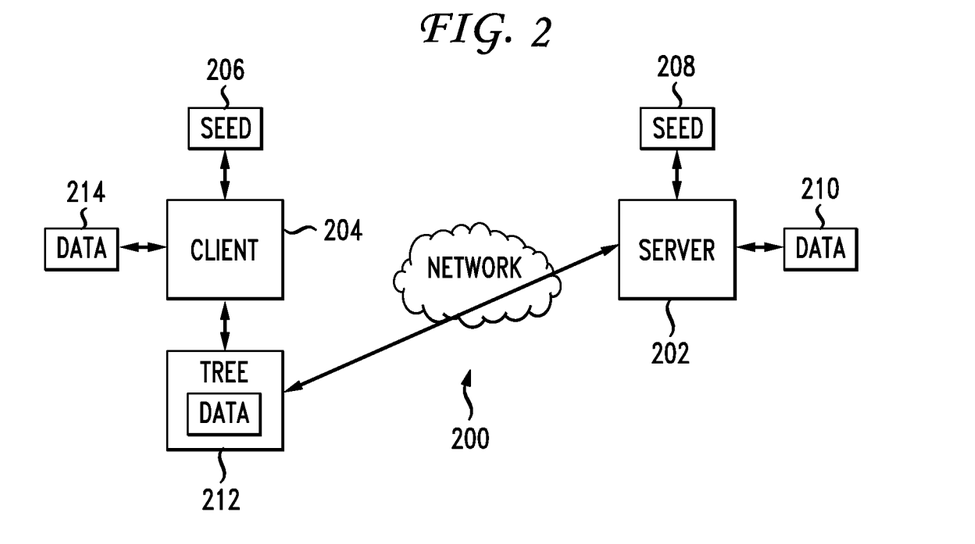
FIG. 2 illustrates an example network configuration.

FIG. 2 illustrates an example network configuration 200. In this configuration, a server 202 and a client 204 that communicate with each other via a network. The server 202 and the client 206 each have access to respective seeds 206, 208. The seed values at the server 202 and the client 204 are the same. The seed values can be distributed in advance, such as by the server 202 or other entity. The seed value can be distributed using standard public key cryptography, public key infrastructure (PKI), or other secure distribution approach. The server 202 can identify a seed value for the client 206 and tie that seed value to a specific user account or payment account. Then, the server 202 can know which seed value(s) are valid for interactions associated with that specific user account or payment account. In one aspect, the client 204 uses a seed value based on a unique device identifier tied to the hardware of the client 204, and that unique device identifier is known to the server 202. If the seed value is not fixed, the server 202 and the client 204 can use and re-use specific seed values. For example, the server 202 and the client 204 can cycle through a set of seed values, using a next seed value after each exchange of a pseudo-random polymorphic tree.

The server 202 identifies data 210 to transmit to the client 204. The server constructs a pseudo-random polymorphic tree 212, as set forth herein, with the data 210 embedded therein. The pseudo-random polymorphic tree appears to be random data to an outsider or an attacker, inasmuch as each segment of the pseudo-random polymorphic is unique among all the other segments. The client 204 receives the pseudo-random polymorphic tree, and unpacks the pseudo-random polymorphic tree according to the seed 206 to extract the data 214.

Figure 3:
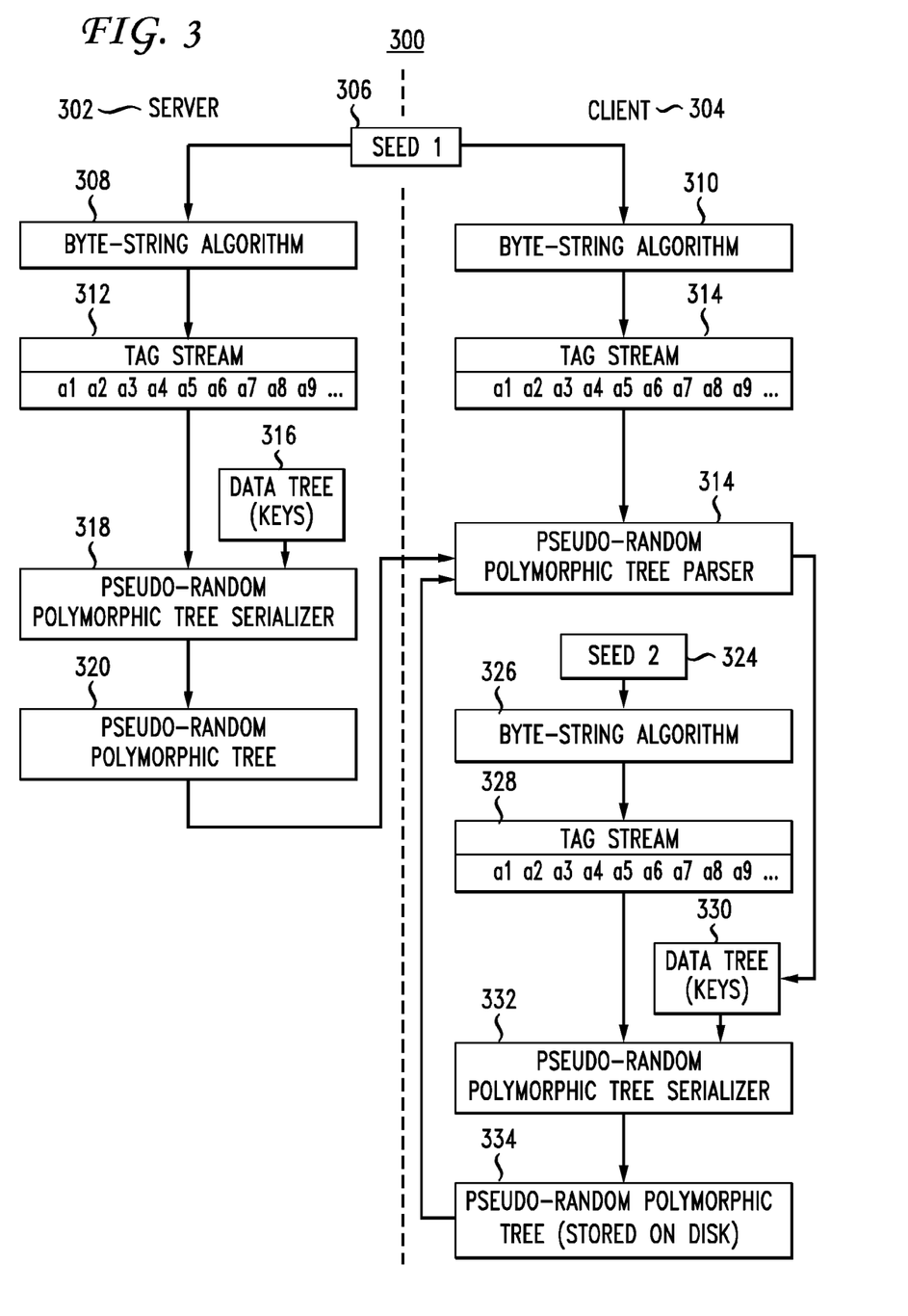
FIG. 3 illustrates an example block diagram representing interactions between a server and a client.

FIG. 3 illustrates an example block diagram 300 representing interactions between a server 302 and a client 304. Seed 1 306 is a shared piece of information, which can be derived from or based on information such as an identifier of a user's account, an identifier of a user's device, a credit card number, or other information which the server 302 and the client 304 share. Seed 1 306 can be fixed length or variable length, as long as the seed value used on the server 302 side is identical to the seed value used on the client 304 side, and as long as the length of seed 1 has sufficient data from which to generate a tag stream. Seed 1 306 can be unique per client or unique for a given user account for use with different clients. Seed 1 306 can alternatively be used by the server 302 with multiple otherwise unrelated clients.

When seed 1 306 is known to both the server 302 and the client 304, the server 302 applies the byte-string algorithm 308 to expand seed 1 306 into a stream of bytes, or the tag stream 312. The client 304 applies an identical byte-string algorithm 310 to expand seed 1 306 into a corresponding tag stream 314. Thus, the server side tag stream 312 and the client side tag stream 314 are exactly the same length and contain the exact same set of bytes. Tag streams can be generated using different seeds and different variables to generate tag streams of different sizes. The byte-string algorithm can impose a maximum size, such as based on an input parameter, on the tag stream and/or on tags in the tag stream. Each tag in the tag stream can be of the same size, such as 1 byte. Alternatively, tags in the tag stream can be of different sizes. Because the small tag is unique if every 4 byte tag is unique then other tags can continue further and take 5, 6, or 7 bytes and can still preserve the uniqueness because the first 4 bytes are going to be unique. There is a minimum length but the tags themselves can potentially be longer than that minimum.

After creating the tag stream 312, the server 302 identifies information to send to the client 304, which can include a list of authorized machines, a list of cryptographic keys, a list of DRM permissions, image data, video data, text data, binary data, executable instructions, and so forth. The information identified can be encoded in a data tree 316 having keys, as shown in the example tree 400 of tags of FIG. 4. The data tree 316 can include other pieces of information to send to the client via the pseudo-random polymorphic tree format. The example tree 400 illustrates a very simple way to store information in a tree. A head node 402 of the tree 400 contains a tag, a length and a value 404. The length describes essentially how many more bytes are in the tree encompassing this value 404, which is a set 406 again of tag-length-values 408 in sequence. This structure can be followed deeper into the tree 400 by continuing according to the value field of a given tag to one level deeper 410 in the tree 400. This step can be repeated any number of times. This structure can enable x number of properties, with each property being represented by a tag. Each tag can have sub-properties indicated by the value field. Nodes in the tree 400 can include pointers or links to other trees or sub-trees, or can be random or pseudo-random bytes that do not represent valuable data.

Figure 4:
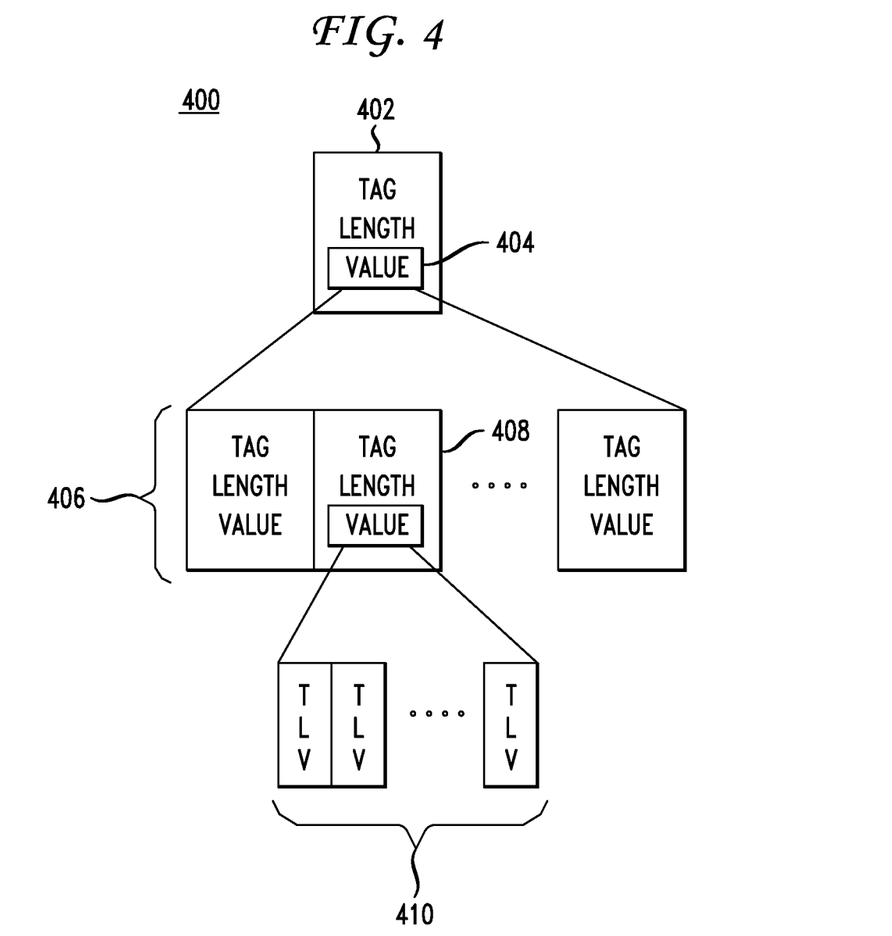
FIG. 4 illustrates example tags from a tag stream.

The tag field is literally a substring of the tag stream and the type of tag. The tree 400 can incorporate multiple tag types. One tag can indicate that the node in the tree is the head node or a tag can indicate "this node contains a key" or "this node contains an ID". The parser can interpret those tags to make sense of the data associated with those tags. The server can send the tree to the client as a data structure or as a big string that the parser 322 on the client side parses into a tree. The value field of a node can indicate the beginning of a value that would be a layer underneath the current tag.

The pseudo-random polymorphic tree parser 322 on the client 304 can extract specific indices that represent tags from a large string that doesn't have repeated sub-strings of length n. Because the client 304 and the client 302 have the same set of pseudo-random looking tags, each can be used to match up to the other. This tag stream is a sequence of bounded limited length that represents the data. The tags in the tag stream are strewn about in the pseudo-random polymorphic tree such that when the client parses it, the client can identify which tags are meaningful. This algorithm provides a way to uniquely define a set of possible tags of length n, a certain number of which are meaningful and certain numbers of which are not. The client looks into the tag stream and matches tags with the random looking tree to determine if a tag is meaningful or just random bytes.

The data tree represents data to send to the client 304. The server 302 passes the tag stream 312 and the data tree 316 to the pseudo-random polymorphic tree serializer 318, which chooses tags from the tag stream 312 to represent and replace the tags from the data tree 316. Those tags can be predetermined and/or labeled. For example, tags labeled a7-a10 can indicate the head, a tag can indicate a sub-tag of a certain type that stores keys, or the tag stream starting with a30 can represent a tag that stores a bit indicating that the client has the ability to play a movie or rent a song or something like that. The pseudo-random polymorphic tree serializer 318 runs a function to construct a serial representation of the pseudo-random polymorphic tree 320. Thus, the pseudo-random polymorphic tree 320 has random length tags, a pseudo-random looking length, and a pseudo-random looking value that is repeated until all the information in the tree is in serial format. The server 302 transmits the pseudo-random polymorphic tree 320, such as via the Internet or other wired or wireless network or via physical transfer of removable media, to the client 304.

The client 304 receives the pseudo-random polymorphic tree 320. The client 304 passes the pseudo-random polymorphic tree 320 and the client-generated tag stream 314 to the pseudo-random polymorphic tree parser 322. The pseudo-random polymorphic tree parser 322 knows in advance which tags and what kind of information to look for. The pseudo-random polymorphic tree parser 322 steps through the pseudo-random looking blob of data in the pseudo-random polymorphic tree 320 and locates tags. Using the tag stream 314 as a dictionary, the pseudo-random polymorphic tree parser 322 steps through the pseudo-random polymorphic tree 320, skipping over tags that it doesn't understand and reading tags that it does understand, to construct a data tree 330 identical to what the server 302 used to create the pseudo-random polymorphic tree 320.

When the client stores the data tree 330 in memory, the threat model is different from network communications, which can be intercepted during transmission. Accordingly, the data tree 330 can be represented in memory in a simpler way, i.e. the data tree doesn't have to be serialized in a pseudo-random way as it is for transmission over network or for other distribution.

The client 304 can save the data tree 330 in local storage, such as a hard disk drive or flash memory. However, certain unsafe local storage locations can introduce similar threats to those encountered in network transmissions. Thus, the client 304 can generate an alternate tag stream 328 of the same or a different length as tag stream 314 using a seed 2 324 with the same byte-string algorithm 326 or a different byte-string algorithm. Using this new tag stream 328, the client 304 processes the data tree 330 using a client-side version of the pseudo-random polymorphic tree serializer 332 to create another pseudo-random polymorphic tree 334, which is stored on disk or in another potentially unsafe location. Due to the different seed (i.e. seed 2 324 vs. seed 1 306), the pseudo-random polymorphic tree 334 stored on the client 304 is different from the pseudo-random polymorphic tree 320 generated and transmitted by the server 302, despite representing the same information. An attacker analyzing the two pseudo-random polymorphic trees 312, 332, which can potentially be of different lengths, would not see the same sequence of repeating bytes. The trees 312, 332 would look different and unrelated.

The client 304 can then recover the data tree 330 from the pseudo-random polymorphic tree 334 by passing the tag stream 328 and the pseudo-random polymorphic tree 334 back to the pseudo-random polymorphic tree parser 322. Certain types of clients may not have the ability to write a polymorphic tree to disk or other storage. For instance, a process may only consume these trees but never store them if it gets rebooted. These types of clients may include the pseudo-random polymorphic tree parser, and not the pseudo-random polymorphic tree serializer.

Figure 5:
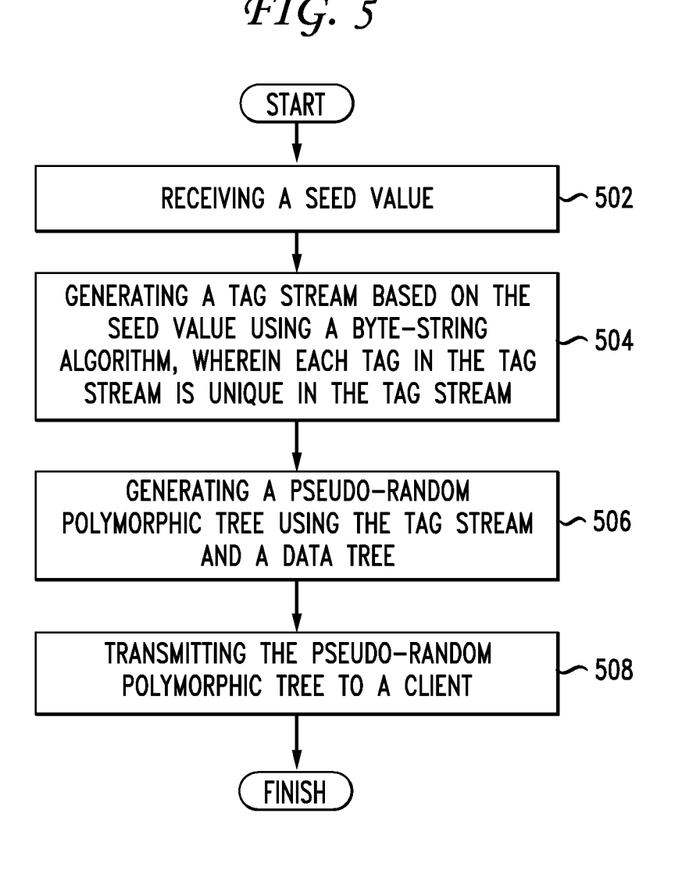
FIG. 5 illustrates a first example method embodiment for generating a pseudo-random polymorphic tree at a server.
Figure 6:
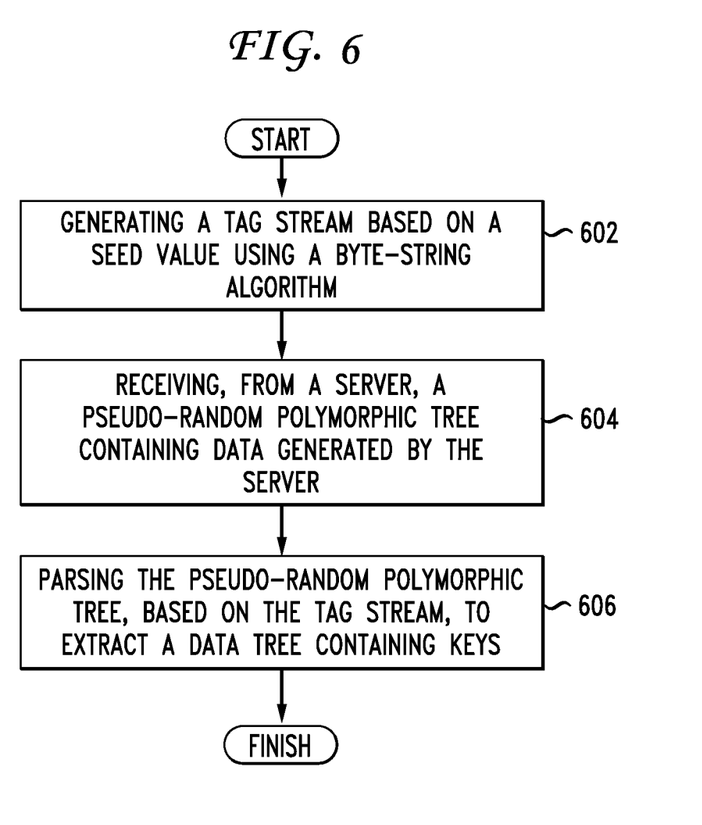
FIG. 6 illustrates a second example method embodiment for parsing a pseudo-random polymorphic tree at a client.
Figure 7:
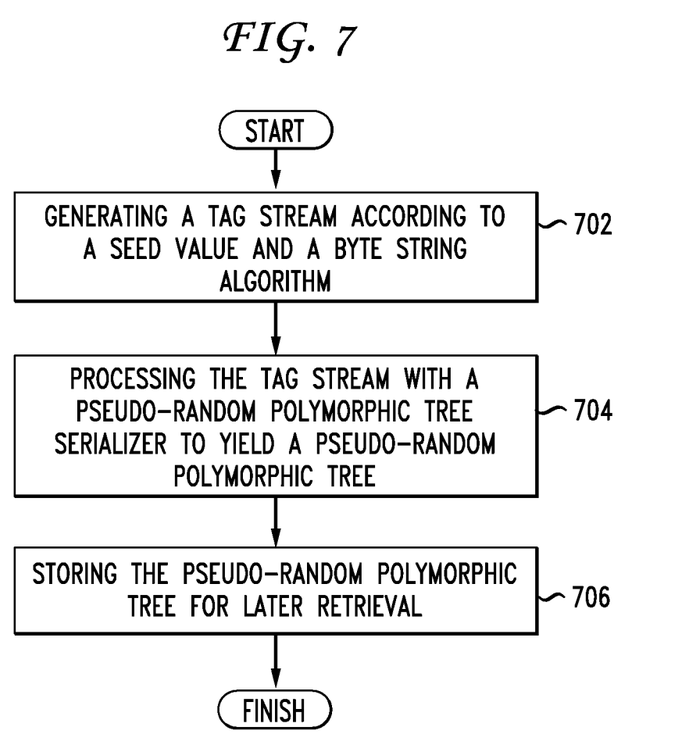
FIG. 7 illustrates a third example method embodiment for generating a pseudo-random polymorphic tree for local storage.
Figure 8:
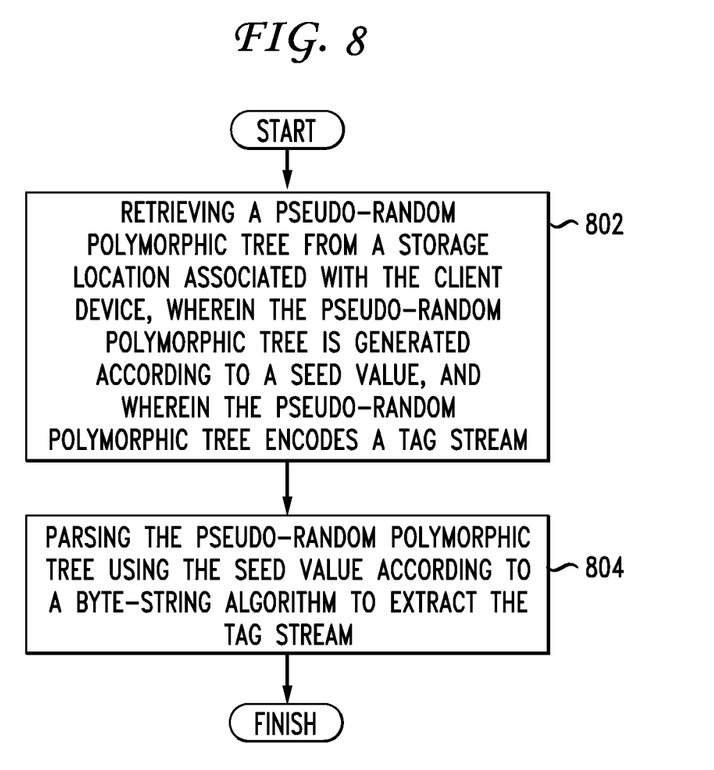
FIG. 8 illustrates a fourth example method embodiment for parsing a locally stored pseudo-random polymorphic tree.

Having disclosed some basic system components and concepts, the disclosure now turns to the exemplary method embodiment shown in FIGS. 5-8. FIG. 5 illustrates server side actions involved in preparing and transmitting the pseudo-random polymorphic tree to the client. FIG. 6 illustrates client side actions for obtaining the seed, then receiving the pseudo-random polymorphic tree from the server and extracting the data from the pseudo-random polymorphic tree. FIG. 7 illustrates client side actions for re-serializing data into a pseudo-random polymorphic tree for local storage. FIG. 8 illustrates client side actions for restoring data from a locally stored pseudo-random polymorphic tree. For the sake of clarity, the methods are discussed in terms of an exemplary system 100 as shown in FIG. 1 configured to practice the respective method. The steps outlined herein are exemplary and can be implemented in any combination thereof, including combinations that exclude, add, or modify certain steps.

FIG. 5 illustrates a first example method embodiment for generating a pseudo-random polymorphic tree at a server. The server first receives and/or generates a seed value (502). Then the server generates a tag stream based on the seed value using a byte-string algorithm, wherein each tag in the tag stream is unique in the tag stream (504). The tag stream can be a unique set of pseudo-random tags that do not collide with tags derived from the data tree.

The server generates a pseudo-random polymorphic tree using the tag stream and a data tree (506), and transmits the pseudo-random polymorphic tree to a client device (508), such as via a wired and/or wireless network. The pseudo-random polymorphic tree can contain a group of segments which, when extracted and reassembled by the client according to the seed value, produce at least one of a cryptographic key, digital rights management information, an identifier, and a cryptographic constant. The group of segments can be a subset of the pseudo-polymorphic tree, with the pseudo-random polymorphic tree containing additional segments which are not included in the group of segments, and which are not part of the data encoded from the data tree. Each segment or node of the pseudo-random polymorphic tree can be unique within the pseudo-random polymorphic tree.

FIG. 6 illustrates a second example method embodiment for parsing a pseudo-random polymorphic tree at a client. The client extracts data from the pseudo-random polymorphic tree by generating the same tag stream as the server, based on the same seed value as on the server and using the same byte-string algorithm as on the server (602). The client receives, from the server, the pseudo-random polymorphic tree containing data generated by the server (604). The client parses the pseudo-random polymorphic tree, based on the tag stream, to extract a data tree containing keys (606). The client only uses a subset of the tag stream to reconstitute the data tree.

FIG. 7 illustrates a third example method embodiment for generating a pseudo-random polymorphic tree for local storage. A client can also store a local version of what the server generates and sends to the client. For example, the client can generate a tag stream according to a seed value and a byte string algorithm (702), process the tag stream and a data tree with a pseudo-random polymorphic tree serializer to yield a pseudo-random polymorphic tree (704), and store the pseudo-random polymorphic tree for later retrieval (706). The data tree can include at least one of a link, an index, a pointer, an executable file, a data packet, an object, a file, an instruction, an image, and media content. The byte string algorithm can take a parameter indicating a length of the tag stream. Further, the tag stream can be bounded to a maximum length. Each tag in the tag stream can be a fixed size, variable size, and/or of multiple different sizes. However, the tag stream can implement a minimum tag size.

FIG. 8 illustrates a fourth example method embodiment for parsing a locally stored pseudo-random polymorphic tree. The client can likewise restore or retrieve the data from a stored pseudo-random polymorphic tree. The client retrieves the pseudo-random polymorphic tree from a storage location associated with the client device, wherein the pseudo-random polymorphic tree is generated according to a seed value, and wherein the pseudo-random polymorphic tree encodes a tag stream (802). The client parses the pseudo-random polymorphic tree using the seed value according to a byte-string algorithm to extract the tag stream (804).

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. Those skilled in the art will readily recognize various modifications and changes that may be made to the principles described herein without following the example embodiments and applications illustrated and described herein, and without departing from the spirit and scope of the disclosure.

We claim:

1. A method comprising:
receiving, at a server computing device, a seed value;
generating a tag stream based on the seed value using a byte-string algorithm, wherein the tag stream is based on a pseudo-random string without a repeat of substring length n, and wherein the byte-string algorithm is an iterative algorithm, wherein each iteration of the algorithm takes a string of length n−1 and adds an n-th character by steps comprising:
mapping all of (n−1)! substrings encountered thus far to a bitmap of possible next bytes,
if an addition of a randomly selected value from the bitmap of possible next bytes produces a repeated substring, then selecting another random value, and
if all available values in from the bitmap of possible next bytes produce repeated substrings, backtracking through the iterative algorithm to find a viable string that does not introduce a repeating substring of length n;
generating a pseudo-random polymorphic tree using the tag stream and a data tree; and
transmitting the pseudo-random polymorphic tree to a client.

2. The method of claim 1, wherein the pseudo-random polymorphic tree contains a plurality of segments which, when extracted and reassembled by the client according to the seed value, produce at least one of a cryptographic key, digital rights management information, an identifier, and a cryptographic constant.

3. The method of claim 2, wherein the plurality of segments comprises a subset of the pseudo-polymorphic tree.

4. The method of claim 3, wherein the pseudo-random polymorphic tree contains additional segments which are not included in the plurality of segments, the additional segments not representing the at least one of the cryptographic key, the digital rights management information, then identifier, and the cryptographic constant.

5. The method of claim 1, wherein each node of the pseudo-random polymorphic tree is unique within the pseudo-random polymorphic tree.

6. The method of claim 1, wherein the tag stream comprises a unique set of pseudo-random tags that do not collide with tags derived from the data tree.

7. The method of claim 1, wherein the pseudo-random polymorphic tree is transmitted to the client via at least one of a wired network and a wireless network.

8. A system comprising:
a processor;
a memory storing instructions for controlling the processor to perform steps comprising:
generating a tag stream based on a seed value using a byte-string algorithm, wherein the tag stream is based on a pseudo-random string without a repeat of substring length n, and wherein the byte-string algorithm is an iterative algorithm, wherein each iteration of the algorithm takes a string of length n−1 and adds an n-th character by steps comprising:
mapping all of (n−1)! substrings encountered thus far to a bitmap of possible next bytes,
if an addition of a randomly selected value from the bitmap of possible next bytes produces a repeated substring, then selecting another random value, and
if all available values in from the bitmap of possible next bytes produce repeated substrings, backtracking through the iterative algorithm to find a viable string that does not introduce a repeating substring of length n;
receiving, from a server, a pseudo-random polymorphic tree containing data generated by the server; and
parsing the pseudo-random polymorphic tree, based on the tag stream, to extract a data tree containing keys.

9. The system of claim 8, wherein the pseudo-random polymorphic tree is generated using a server-side tag stream and a server-side data tree.

10. The system of claim 9, wherein the server-side tag stream is generated based on the seed value.

11. The system of claim 8, wherein a subset of the tag stream is used to extract the data tree.

12. The system of claim 8, wherein the tag stream is identical to a server-side tag stream.

13. The system of claim 8, wherein the data tree contains wireless synchronization data.

14. A non-transitory computer-readable storage medium storing instructions which, when executed by a computing device, cause the computing device to perform steps comprising:
generating a tag stream according to a seed value and a byte string algorithm, wherein the tag stream is based on a pseudo-random string without a repeat of substring length n, and wherein the byte-string algorithm is an iterative algorithm, wherein each iteration of the algorithm takes a string of length n−1 and adds an n-th character by steps comprising:
mapping all of (n−1)! substrings encountered thus far to a bitmap of possible next bytes,
if an addition of a randomly selected value from the bitmap of possible next bytes produces a repeated substring, then selecting another random value, and
if all available values in from the bitmap of possible next bytes produce repeated substrings, backtracking through the iterative algorithm to find a viable string that does not introduce a repeating substring of length n;
processing the tag stream and a data tree with a pseudo-random polymorphic tree serializer to yield a pseudo-random polymorphic tree; and
storing the pseudo-random polymorphic tree for later retrieval.

15. The non-transitory computer-readable storage medium of claim 14, wherein the data tree comprises at least one of a link, an index, a pointer, an executable file, a data packet, an object, a file, an instruction, an image, and media content.

16. The non-transitory computer-readable storage medium of claim 14, wherein the byte string algorithm takes a parameter indicating a length of the tag stream.

17. The non-transitory computer-readable storage medium of claim 14, wherein the tag stream is bounded to a maximum length.

18. The non-transitory computer-readable storage medium of claim 14, wherein each tag in the tag stream is a fixed size.

19. The non-transitory computer-readable storage medium of claim 14, wherein tags in the tag stream are of multiple sizes.

20. The non-transitory computer-readable storage medium of claim 19, wherein each of the tags is at least a minimum tag size.

21. A method comprising:
retrieving, at a client device, a pseudo-random polymorphic tree from a storage location associated with the client device, wherein the pseudo-random polymorphic tree is generated according to a seed value, and wherein the pseudo-random polymorphic tree encodes a tag stream, wherein the tag stream is based on a pseudo-random string without a repeat of substring length n, and wherein the byte-string algorithm is an iterative algorithm, wherein each iteration of the algorithm takes a string of length n−1 and adds an n-th character by steps comprising:
mapping all of (n−1)! substrings encountered thus far to a bitmap of possible next bytes,
if an addition of a randomly selected value from the bitmap of possible next bytes produces a repeated substring, then selecting another random value, and
if all available values in from the bitmap of possible next bytes produce repeated substrings, backtracking through the iterative algorithm to find a viable string that does not introduce a repeating substring of length n; and
parsing the pseudo-random polymorphic tree using the seed value according to a byte-string algorithm to extract the tag stream.

22. The method of claim 21, wherein the storage location comprises at least one of volatile memory and non-volatile storage.

23. The method of claim 21, wherein the pseudo-random polymorphic tree is parsed via a pseudo random polymorphic tree parser that knows in advance which set of tags to look for and what kind of information to expect, wherein the pseudo random polymorphic tree parser steps through pseudo-random polymorphic tree to find the set of tags using the tag stream as a dictionary, skipping over tags that are not part of the set of tags.

* * * * *

UNITED STATES PATENT AND TRADEMARK OFFICE
CERTIFICATE OF CORRECTION

| | | |
|---|---|---|
| PATENT NO. | : 8,699,703 B2 | Page 1 of 1 |
| APPLICATION NO. | : 13/276612 | |
| DATED | : April 15, 2014 | |
| INVENTOR(S) | : Nicholas T. Sullivan et al. | |

It is certified that error appears in the above-identified patent and that said Letters Patent is hereby corrected as shown below:

In the Claims
In Claim 1, Column 12, line 39, please change "values in from the" to --values from the--.
In Claim 2, Column 12, lines 52-53, please change "identifier, and a cryptographic constant" to --identifier, or a cryptographic constant--.
In Claim 8, Column 13, line 20, please change "values in from the" to --values from the--.
In Claim 14, Column 13, line 56, please change "values in from the" to --values from the--.
In Claim 15, Column 14, line 9, please change "an image, and media content" to --an image, or media content--.
In Claim 21, Column 14, line 41, please change "values in from the" to --values from the--.

Signed and Sealed this
Second Day of September, 2014

Michelle K. Lee
*Deputy Director of the United States Patent and Trademark Office*